(12) United States Patent
Pi et al.

(10) Patent No.: US 7,835,315 B2
(45) Date of Patent: Nov. 16, 2010

(54) METHOD AND APPARATUS FOR PROVIDING ADDRESSING IN A MULTI-CARRIER COMMUNICATION SYSTEM

(75) Inventors: Zhouyue Pi, San Diego, CA (US); Zhigang Rong, San Diego, CA (US); Lin Ma, San Diego, CA (US); Fei Frank Zhou, San Diego, CA (US); Mark W. Cheng, San Diego, CA (US); Jian Gu, Huangqi Nanhai Guangdong (CN); Zhu Yuan, Beijing (CN)

(73) Assignee: Nokia Corporation, Espoo (FI)

( * ) Notice: Subject to any disclaimer, the term of this patent is extended or adjusted under 35 U.S.C. 154(b) by 1118 days.

(21) Appl. No.: 11/507,933

(22) Filed: Aug. 22, 2006

(65) Prior Publication Data

US 2007/0064692 A1 Mar. 22, 2007

Related U.S. Application Data

(60) Provisional application No. 60/710,707, filed on Aug. 23, 2005, provisional application No. 60/711,048, filed on Aug. 24, 2005.

(51) Int. Cl.
*H04H 20/71* (2008.01)

(52) U.S. Cl. .................................................. 370/312

(58) Field of Classification Search ................. 711/130; 370/312, 315, 329
See application file for complete search history.

(56) References Cited

U.S. PATENT DOCUMENTS

| | | | | |
|---|---|---|---|---|
| 5,784,597 A | * | 7/1998 | Chiu et al. ................... | 713/401 |
| 5,787,483 A | * | 7/1998 | Jam et al. .................... | 711/158 |
| 5,883,901 A | * | 3/1999 | Chiu et al. .................. | 370/508 |
| 7,342,901 B1 | * | 3/2008 | Zhang et al. ................. | 370/329 |
| 2002/0039355 A1 | * | 4/2002 | Yun et al. .................... | 370/318 |
| 2003/0223393 A1 | * | 12/2003 | Lee .............................. | 370/335 |
| 2008/0095115 A1 | * | 4/2008 | Jung ........................... | 370/331 |
| 2009/0044082 A1 | * | 2/2009 | Landau et al. .............. | 714/790 |

FOREIGN PATENT DOCUMENTS

KR 2003-0093592 12/2003

OTHER PUBLICATIONS

3GPP2 A.S0001-A, Version 2.0, 3GPP2 Access Network Interfaces Interoperability Specification, Revision A (3G-IOSv4.1), Jun. 2001, pp. 1-1046.

(Continued)

*Primary Examiner*—Diane Mizrahi
(74) *Attorney, Agent, or Firm*—Ditthavong Mori & Steiner, P.C.

(57) ABSTRACT

An approach is provided for addressing in a multiple carrier communication system. In one embodiment, a group index is assigned to a group of terminals of a communication network. The group index permits sharing of addressing indices supported by the communication network for transmission of data to the group of terminals. In another embodiment, a plurality of terminals is classified using preamble indices corresponding to the terminals into one or more classes. A multi-user packet, which utilizes the preamble indices to activate only a class of the terminals for processing the multi-user packet, is generated.

14 Claims, 16 Drawing Sheets

OTHER PUBLICATIONS

3GPP2 A.S00007-A v2.0, Interoperability Specification (IOS) for High Rate Packet Data (HRPD) Access Network Interfaces—Rev A., May 2003, pp. 1-212.

3GPP2 A.S0008-0 v3.0, Interoperability Specification (IOS) for High Rate Packet Data (HRPD) Access Network Interfaces, May 2003, pp. 1-128.

3GPP2 C.S0024-A, Version 1.0, cdma2000 High Rate Packet Data Air Interface Specification, Mar. 2004, pp. 1-1083.

Korean Office Action for corresponding Korean Application No. 10-2008-7006826, Feb. 1, 2010, Korea.

Rezaiifar, R.: 3GPP2 Meeting, Increased Forward Link MAC Indices for multi-carrier operation, Jun. 20, 2005, pp. 1-2.

* cited by examiner

METHOD AND APPARATUS FOR PROVIDING ADDRESSING IN A MULTI-CARRIER COMMUNICATION SYSTEM

RELATED APPLICATIONS

This application claims the benefit of the earlier filing date under 35 U.S.C. §119(e) of U.S. Provisional Application Ser. No. 60/710,707 filed Aug. 23, 2005, entitled "Method and Apparatus for Providing Addressing in a Multi-Carrier Communication System," and U.S. Provisional Application Ser. No. 60/711,048 filed Aug. 24, 2005, entitled "Multi-User Packet and Media Access Control Layer Enhancement for Same"; the entireties of which are incorporated by reference.

FIELD OF THE INVENTION

Embodiments of the invention relate to communications, and more particularly, to a multi-carrier communication system.

BACKGROUND

Radio communication systems, such as cellular systems (e.g., spread spectrum systems (such as Code Division Multiple Access (CDMA) networks), or Time Division Multiple Access (TDMA) networks), provide users with the convenience of mobility along with a rich set of services and features. This convenience has spawned significant adoption by an ever growing number of consumers as an accepted mode of communication for business and personal uses in terms of communicating voice and data (including textual and graphical information). As a result, cellular service providers are continually challenged to enhance their networks and services. These objectives place a premium on efficient management of network capacity.

The development of multi-carriers systems stem, in part, from the recognition that greater data rates are required to support sophisticated applications, and the general need for better system performance. One area of interest is the signaling and addressing required to support numerous terminals over the multiple carriers. Because multiple carriers are available, the number of terminals that can be serviced exceeds that of a single carrier system. Hence, the addressing scheme suitable for the single carrier system is inadequate; this poses an interesting challenge as existing protocols and standards play a key factor in development of new addressing approaches.

Another challenge is that an addressing scheme for the multi-carrier system has to consider backwards compatibility issues with respect to the single carrier system.

Therefore, there is a need for an approach to provide an efficient addressing scheme, with minimal modification of existing standards and protocols.

SOME EXEMPLARY EMBODIMENTS

These and other needs are addressed by the embodiments of the invention, in which an approach is presented for extending the addressing scheme of a single carrier system to a multi-carrier system.

According to one aspect of an embodiment of the invention, a method comprises assigning a group index to a group of terminals of a communication network. The group index permits sharing of addressing indices supported by the communication network for transmission of data to the group of terminals.

According to another aspect of an embodiment of the invention, an apparatus comprises a processor configured to assign a group index to a group of terminals of a communication network. The group index permits sharing of addressing indices supported by the communication network for transmission of data to the group of terminals.

According to another aspect of an embodiment of the invention, a method comprises generating a request, by a terminal, for a transmission channel, and transmitting the request to an access network. One of a plurality of addressing indices is mapped to the transmission channel. The method also comprises receiving a packet from the access network over the transmission channel. Additionally, the method comprises determining whether the packet includes an intragroup index that uniquely identifies the terminal among a group of terminals. The group of terminals is associated with a group index. The method further comprises processing the packet, by the terminal, if the packet specifies the intragroup index of the terminal.

According to another aspect of an embodiment of the invention, an apparatus comprises a processor configured to generate a request, by a terminal, for a transmission channel. The apparatus also comprises a transceiver configured to transmit the request to an access network, wherein one of a plurality of addressing indices is mapped to the transmission channel. The transceiver is further configured to receive a packet from the access network over the transmission channel, wherein the processor is further configured to determine whether the packet includes an intragroup index that uniquely identifies the terminal among a group of terminals. The group of terminals is associated with a group index. The processor is further configured to process the packet, by the terminal, if the packet specifies the intragroup index of the terminal.

According to another aspect of an embodiment of the invention, a method comprises classifying a plurality of terminals using preamble indices corresponding to the terminals into one or more classes. The method also comprises generating a multi-user packet that utilizes the preamble indices to activate only a class of the terminals for processing the multi-user packet.

According to yet another aspect of an embodiment of the invention, an apparatus comprises a classification module configured to classify a plurality of terminals using preamble indices corresponding to the terminals into one or more classes. The apparatus also comprises a processor configured to generate a multi-user packet that utilizes the preamble indices to activate only a class of the terminals for processing the multi-user packet.

Still other aspects, features, and advantages of the embodiments of the invention are readily apparent from the following detailed description, simply by illustrating a number of particular embodiments and implementations, including the best mode contemplated for carrying out the embodiments of the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for providing addressing mechanisms for use in a multiple carrier communication system are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments of the invention are discussed with respect to a spread spectrum system and Walsh codes, it is recognized by one of ordinary skill in the art that these embodiments of the inventions have applicability to any type of radio communication system and other orthogonal codes. The invention, according to one embodiment, provides Third Generation Partnership Project 2 (3GPP2) cdma2000 Multi-Carrier Requirements in Code Division Multiple Access (CDMA) N×EV-DO (Evolution Data-Only) networks.

Figure 1:
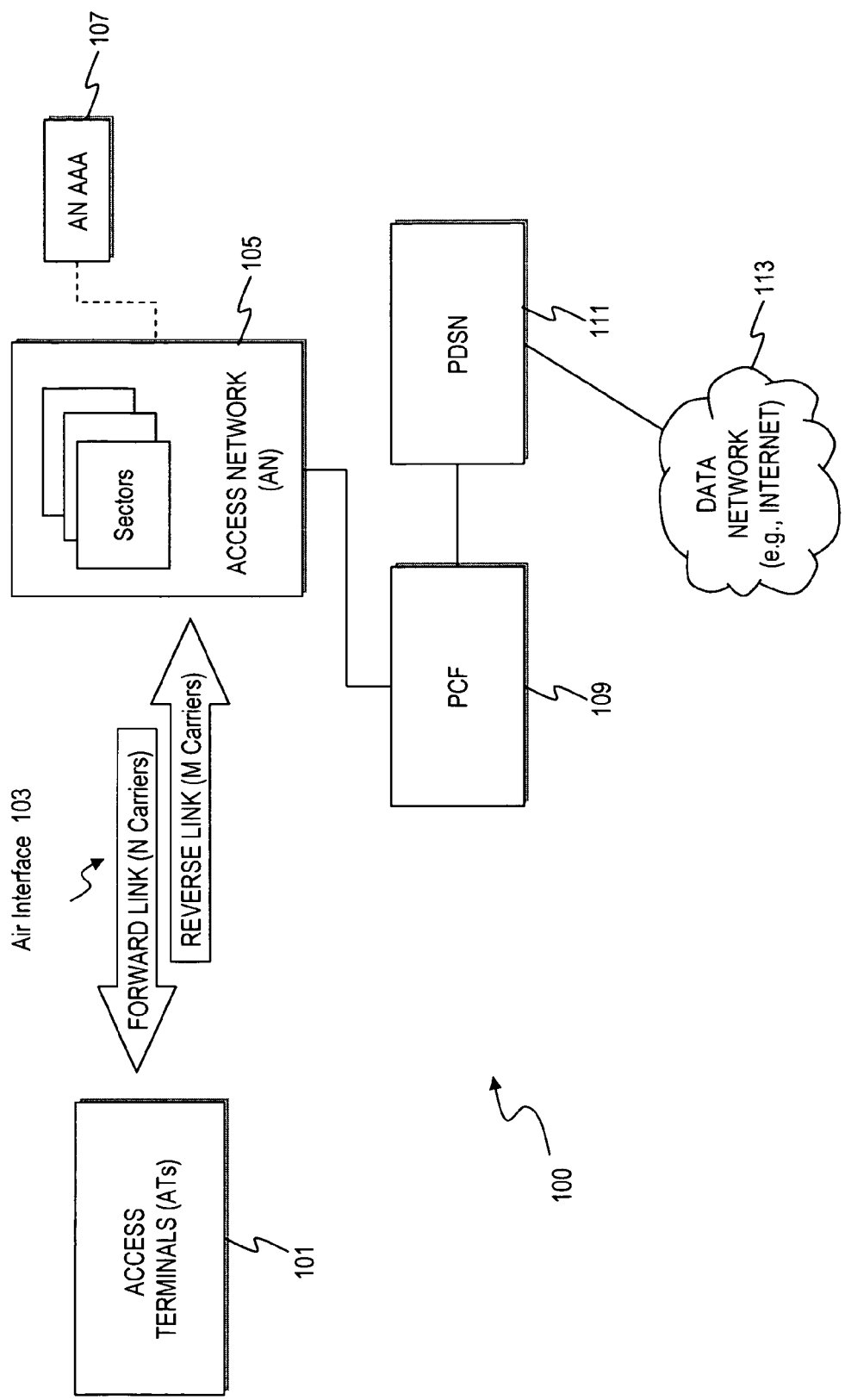
FIG. 1 is a diagram of the architecture of a wireless system capable of supporting an addressing scheme for use with multiple carriers, in accordance with an embodiment of the invention.

A radio network 100 operates according to the Third Generation Partnership Project 2 (3GPP2) standard for supporting High Rate Packet Data (HRPD). In FIG. 1, the radio network 100 includes one or more access terminals (ATs) 101 of which one AT is shown in communication with an access network (AN) 105 over an air interface. In cdma2000 systems, the AT 101 is equivalent to a mobile station, and the access network is equivalent to a base station. The AT 101 is a device that provides data connectivity to a user. For example, the AT 101 can be connected to a computing system, such as a personal computer, a personal digital assistant, and etc. or a data service enabled cellular handset. The radio configuration encompasses two modes of operations: 1× and multi-carrier (i.e., N number of carriers). Multi-carrier systems employ multiple 1× carriers to increase the data rate to the AT (or mobile station) 101 over the forward link. Hence, unlike 1× technology, the multi-carrier system operates over multiple carriers. In other words, the AT 101 is able to access multiple carriers simultaneously. Additionally, the reverse link can utilize multiple carriers (M number of carriers).

In the multiple-access wireless communication system 100, communications between users are conducted through one or more Access Networks (AN(s)) 105 and a user (Access Terminal (AT)) 101 on one wireless subscriber station communicates to a second user on a second wireless subscriber station by conveying information signal on a reverse link to a base station. In one embodiment, the AN 105 is a network equipment that provides data connectivity between a packet switched data network 113, such as the global Internet, and the AT 101. The AN 105 receives the information signal and conveys the information signal on a forward link to the AT station 101. The forward link refers to transmissions from the AN 105 to a wireless subscriber station and the reverse link refers to transmissions from a wireless subscriber station to the AN 105. The AN 105 receives the data from the first user on the wireless subscriber station on a reverse link, and routes the data through a public or private data network 113, to the second user on the data network 113. In many communication systems, e.g., IS-95, Wideband CDMA (WCDMA), and IS-2000, the forward link and the reverse link are allocated separate frequencies.

A connection is a particular state of the air-link in which the AT 101 is assigned a Forward Traffic Channel, a Reverse Traffic Channel and associated Medium Access Control (MAC) Channels. During a single HRPD session, the AT 101 and the AN 105 can open and can close a connection multiple times. An HRPD session refers to a shared state between the AT 101 and the AN 105. This shared state stores the protocols and protocol configurations that were negotiated and are used for communications between the AT 101 and the AN 105. Other than to open a session, the AT 101 cannot communicate with the AN 105 without having an open session. When transmitting over the forward traffic channel, the AN 105 uses, for example, a MAC index (denoted as "MAC ID" or "MACIndex")) to identify the target AT 101. By way of example, each Walsh channel is identified by a MACIndex value and defines a Walsh cover and a unique modulation phase. A more detailed description of the HRPD is provided in 3GPP2 C.S0024-A, entitled "cdma2000 High Rate Packet Data Air Interface Specification," March 2004, A.S0007-A v2.0, entitled "Interoperability Specification (IOS) for High Rate Packet Data (HRPD) Access Network Interfaces—Rev.

A," May 2003, and 3GPP2 A.S0008-0 v3.0, entitled "Interoperability Specification (IOS) for High Rate Packet Data (HRPD) Access Network Interfaces," May 2003; which are incorporated herein by reference in their entireties.

In a 1×DO system, typically, each Access Terminal (AT) 101 is assigned a Medium Access Control Index (MAC ID). The packet transmitted to each AT 101 is identified by the MAC ID; such addressing is necessary so that the ATs 101 will not confuse other users' packets as its own and vice versa. However, traditional approaches dictate that up to 64 MAC IDs per 1×DO carrier are available in DO Rev. 0, and up to 128 MAC IDs per 1×DO carrier available in DO Rev. A. With increased capacity in the N×DO system, it is likely that a DO carrier need to support more than 128 ATs, resulting in MAC ID shortage.

The AN 105 communicates with a Packet Data Service Node (PDSN) 111 via a Packet Control Function (PCF) 109. Either the AN 105 or the PCF 109 provides a SC/MM (Session Control and Mobility Management) function, which among other functions includes storing of HRPD session related information, performing the terminal authentication procedure to determine whether an AT 101 should be authenticated when the AT 101 is accessing the radio network, and managing the location of the AT 101. The PCF 109 is further described in 3GPP2 A.S0001-A v2.0, entitled "3GPP2 Access Network Interfaces Interoperability Specification," June 2001, which is incorporated herein by reference in its entirety.

In addition, the AN 105 communicates with an AN-AAA (Authentication, Authorization and Accounting entity) 107, which provides terminal authentication and authorization functions for the AN 105.

The AN 105 includes a High Rate Packet Data (HRPD) base station to support high data rate services. It should be understood that the base station provides the RF interface (carrier(s)) between an access terminal and the network via one or more transceivers. The HRPD base station provides a separate data only (DO) carrier for HRPD applications for each sector (or cell) served by the HRPD base station. A separate base station or carrier (not shown) provides the voice carrier(s) for voice applications. A HRPD access terminal 101 may be a DO access terminal or a dual mode mobile terminal capable of utilizing both voice services and data services. To engage in a data session, the HRPD access terminal 101 connects to a DO carrier to use the DO high-speed data service. The data session is controlled by a Packet Data Service Node (PDSN) 111, which routes all data packets between the HRPD access terminal 101 and the Internet 113. The PDSN 111 has a direct connection to a Packet Control Function (PCF) 109, which interfaces with a Base Station Controller (BSC) (not shown) of the HRPD base station. The BSC is responsible for operation, maintenance and administration of the HRPD base station, speech coding, rate adaptation and handling of the radio resources. It should be understood that the BSC may be a separate node or may be co-located with one or more HRPD base stations.

In a 1× carrier, each HRPD base station can serve multiple (e.g., three) sectors (or cells). However, it should be understood that each HRPD base station may serve only a single cell (referred to as an omni cell). It should also be understood that the network may include multiple HRPD base stations, each serving one or more sectors, with HRPD mobile terminals being capable of handing off between sectors of the same HRPD base station or sectors of different HRPD base stations. For each sector (or cell), the HRPD base station further employs a single shared, time division multiplexed (TDM) forward link, where one single HRPD mobile terminal can be served by single user packets and multiple mobile terminals can be served by multi-user packets at any instance. The forward link throughput rate is shared by all HRPD mobile terminals. A HRPD access terminal selects a serving sector (or cell) of the HRPD base station by pointing its Data Rate Control (DRC) towards the sector and requesting a forward data rate according to the channel conditions (i.e., based on the Carrier to Interference (C/I) ratio of the channel).

Wireless communication technologies continue to evolve to provide higher data rate and better quality of service for a variety of applications with distinct characteristics. The cdma2000 High Rate Packet Data (HRPD) standard provides high data rate over a 1.25 MHz carrier frequency. This system provides Data Only (DO) service in one 1.25 MHz carrier (1×), which sometimes is referred to as 1× DO system. To further improve the service provisioning, this cdma2000 HRPD standard needs to account for multi-carrier CDMA systems, e.g., system 100. In this system 100 (referred to as multi-carrier HRPD (MC-HRPD) system, or N×DO system), the access terminal (AT) 101 can transmit and/or receive data streams in multiple 1.25 MHz bands.

One approach for accommodating a multitude of ATs 101 in a multi-carrier operation is explained in 3GPP2 contribution, C25-20050620-030, entitled "Increased Forward Link MAC Indices For Multi-Carrier Operation," Jun. 20, 2005 (which is incorporated herein by reference in its entirety).

As mentioned, in a multi-carrier system, traditional approaches to addressing of the terminals 101 lack the ability to scale—that is, there is a shortage of MAC indices. The system 100 permits, according to various embodiments, sharing of MAC indices through the use of group addresses (or group indices), as explained in FIGS. 2-8, and the use of multi-user packets (as described in FIGS. 9-11).

Figure 2:
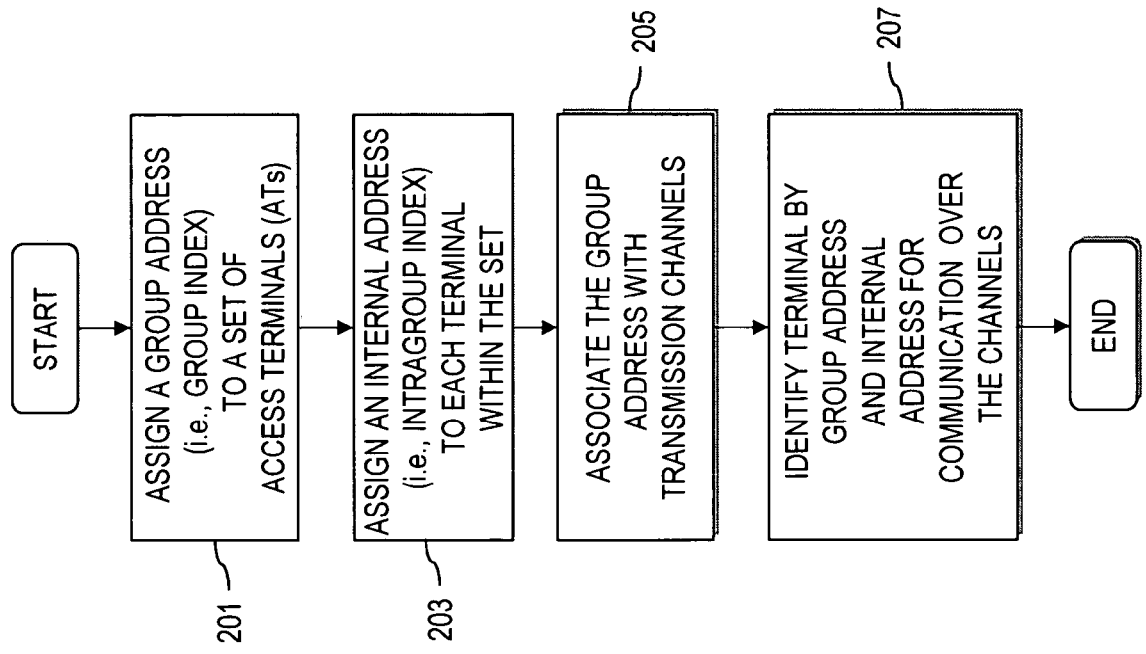
FIG. 2 is a flowchart of a process for assigning addresses to access terminals, in accordance with an embodiment of the invention.

FIG. 2 is an exemplary flowchart of a process for assigning addresses to access terminals 101, in accordance with an embodiment of the invention. By way of example, in step 201, the system 100 can assign a group address (i.e., group index) to set of access terminals 101. In order to identify each set of the access terminals 101, an internal address (i.e., intragroup index) is assigned to each terminal within the set of access terminals 101, per step 203. In step 205, transmission channels of the system 100 are associated with the assigned group address. In this regards, the system 100 can utilize a single transmission channel for a set of access terminals 101, and the system 100 can identify a terminal using the group address and corresponding internal address in the communication over the transmission channels, as in step 207.

Figure 3:
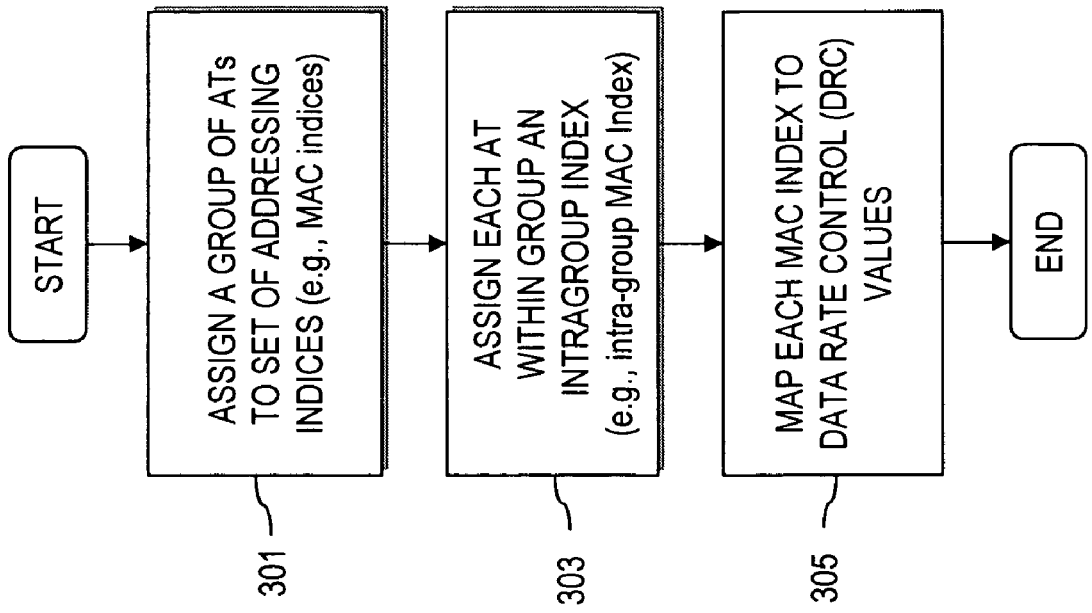
FIG. 3 is a flowchart of a process for assigning addresses to access terminals utilizing group addresses and intragroup addresses, in accordance with an embodiment of the invention.

The group addresses and internal addresses, in one embodiment, are based on MAC indices, as explained in FIG. 3.

As seen in the FIG. 3, the system 100 can assign a group of ATs 101 to a set of addressing indices, e.g., MAC indices (MAC IDs), per step 301. To identify the ATs 101 uniquely within the group, the system 100 assigns, as in step 303, each AT 101 within the group an intragroup index—e.g., intragroup MAC index (denoted as "IntraGroupMACIndex"). Then, the system 100 can map each MACIndex to a transmission channel, e.g., DRC (Data Rate Control) channel, as in step 305.

The above addressing mechanism, according to one embodiment of the invention, allows a group of ATs 101 to share a set of MAC IDs. By defining a mapping between MAC IDs and transmission channels (e.g., DRCs (Data Rate Controls), the mechanism advantageously reduces false alarm rate and unnecessary decoding of physical layer packets that are intended for other ATs 101. In one embodiment of the invention, a group of ATs 101 share a set of MAC IDs, with each MAC ID associated with one DRC. The size of the group of ATs 101 can be larger than the size of the group of MAC IDs assigned to the ATs 101. The differentiation among these ATs 101 is made by an intragroup index or internal address (e.g., intra-group MAC index) within, for instance, the physical layer payload.

Figure 4:
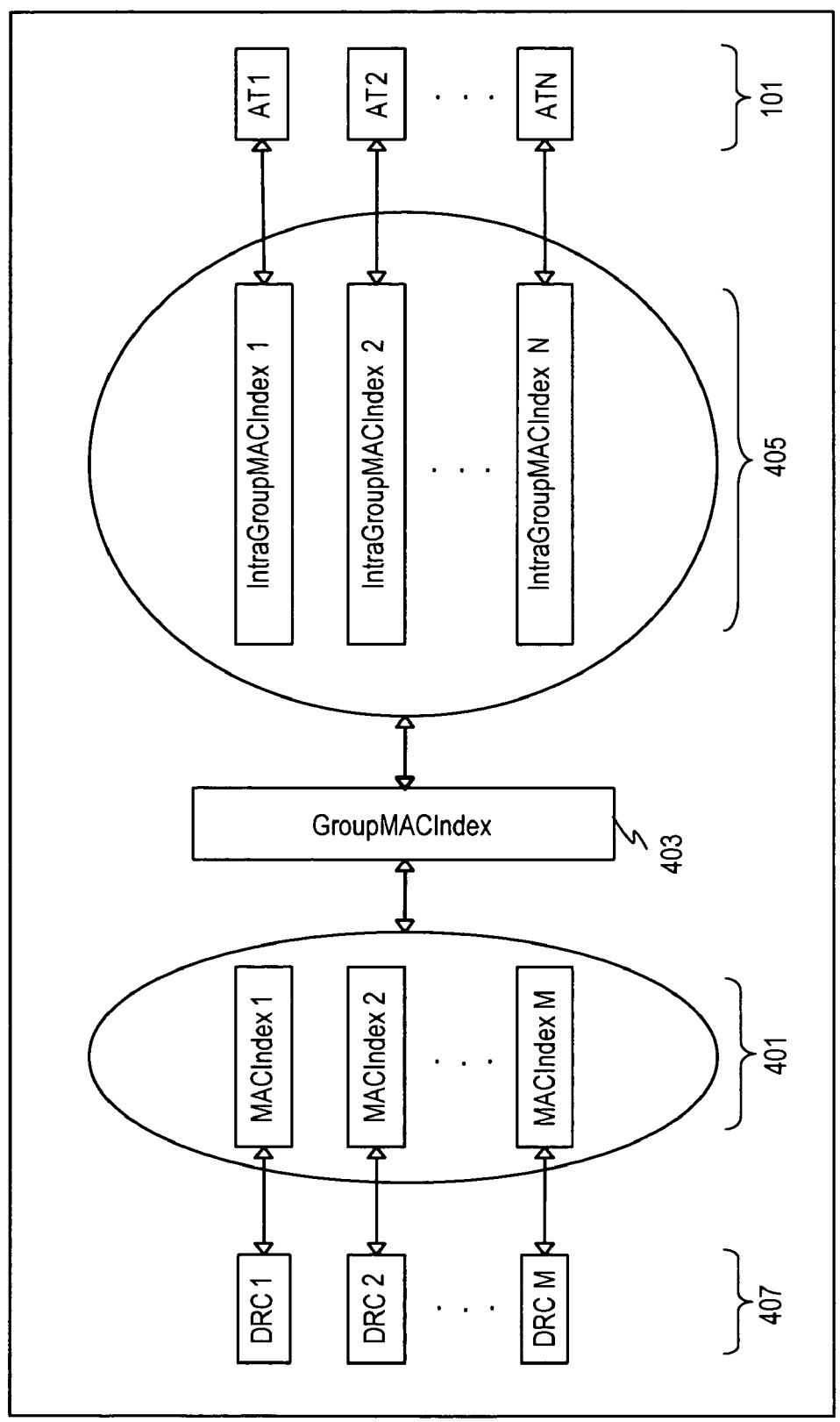
FIG. 4 is a diagram showing the relationship between group addresses and intragroup addresses, according to various embodiments of the invention.

The relationship of the ATs 101, GroupMACIndex, IntraGroupMACIndex, MACIndex (as defined in the DO standard), and DRCs are illustrated in FIG. 4.

To better appreciate the addressing mechanism of FIGS. 2 and 3, it is instructive to examine, in more detail, the addressing mechanism of a HRPD/DO system, and the mechanism of the forward link variable rate transmission.

In a DO system, each AT 101 is assigned a MACIndex i=0, 1, ..., 127, which is the "address" of the AT 101. A preamble sequence is transmitted with each forward link physical layer packet in order to assist the AT 101 with synchronization of each variable-rate transmission. The preamble specifies all-'0' symbols transmitted on the in-phase component. The preamble is time multiplexed with the Forward Traffic Channel or Control Channel modulation chips that carries physical layer payload. The preamble sequence is covered by a 64-chip bi-orthogonal sequence, and the sequence is repeated several times depending on the transmit mode. The bi-orthogonal sequence is specified in terms of the 64-ary Walsh functions and their bit-by-bit complements by, for example:

$W_{i/2}^{64}$ for i=0, 2, ..., 126

$\overline{W}_{(i-1)/2}^{64}$ for i=1, 3, ..., 127 where i=0, 1, ..., 127 is the MACIndex value of the intended AT 101 and $\overline{W}_i^{64}$ is the bit-by-bit complement of the 64-chip Walsh function of order i.

This scheme supports only 128 ATs 101 if the MACIndex is used as the addressing mechanism. To support more than 128 ATs 101 in a DO carrier, certain ATs 101 have to share MACIndex. The drawback with this mechanism is that this particular shared multi-user packet is essentially a broadcast packet, which "wakes up" a large number of ATs 101 in the whole sector when used. The broadcast would waste resources; for example, the AT's battery life would be reduced needlessly if the packet contained no information for the AT 101.

The addressing scheme, as shown in the FIG. 4, according to various embodiments of the invention, effectively provides the ability for multiple ATs 101 to share MAC IDs 401—e.g., MACIndex1 ... MACIndex M (where M is an integer). Each group of ATs 101 is assigned a group index, GroupMACIndex 403. Each GroupMACIndex 403 is associated with a set of MACIndex 401 as originally defined in the DO system. Within each group, ATs 101 are identified by their IntraGroupMACIndex 405. A mapping is defined between the set of MACIndex 401 and all possible DRC values 407.

Figure 5:
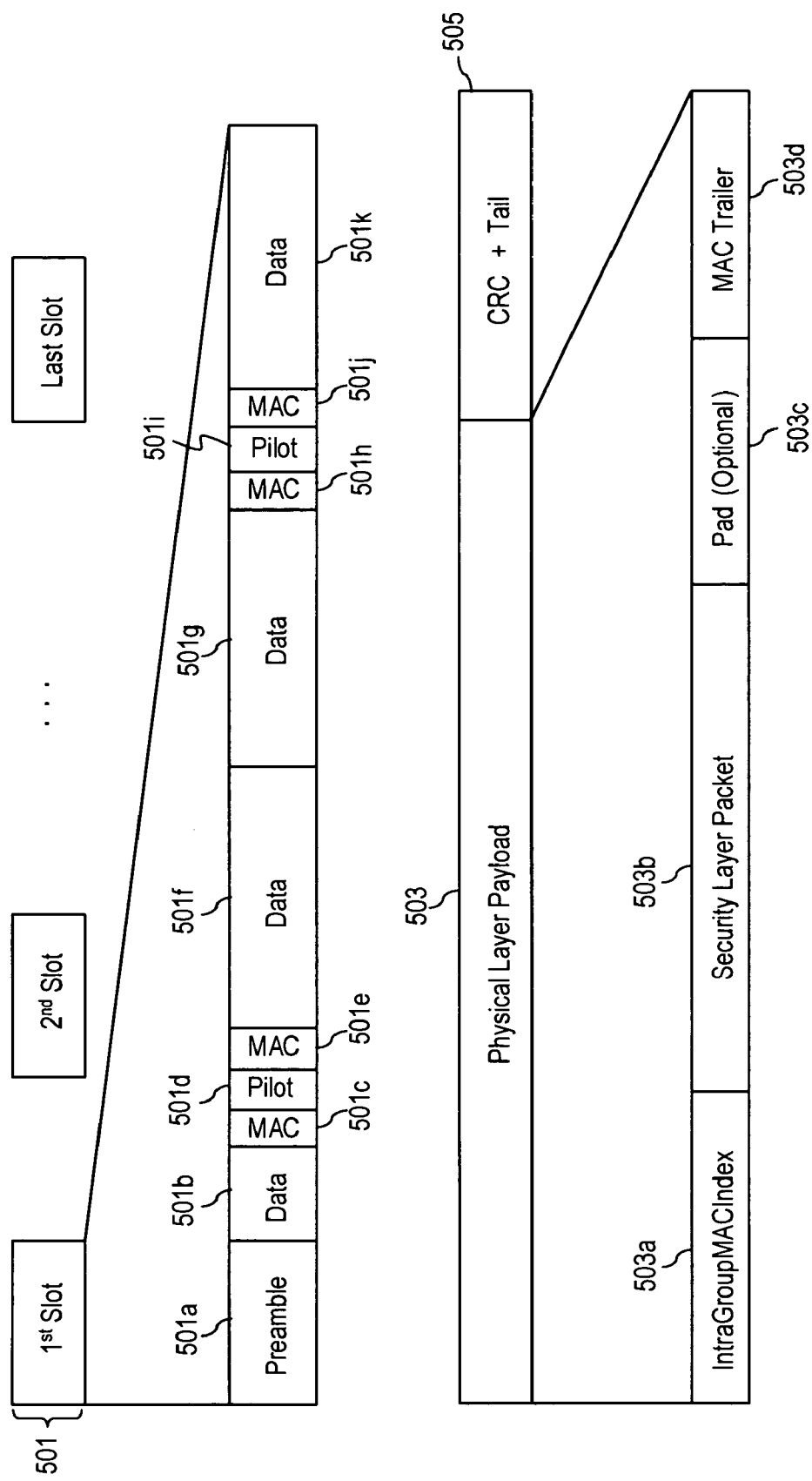
FIG. 5 is a diagram of an exemplary packet format for the addressing scheme of FIG. 4, in accordance with an embodiment of the invention.

FIG. 5 is a diagram of an exemplary packet format for the addressing scheme of FIG. 4, in accordance with an embodiment of the invention. A packet is transmitted in one or more slots 501. In this example, the first slot includes a preamble field 501a for specifying a preamble index, a data field 501b and a MAC field 501c for the MAC ID as well as a Pilot field 501d. The slot 501 can also include other data fields, 501f, 501g and 501k, along with MAC fields 501h and 501j. Another Pilot field 501i is provided.

The packet can additionally include the physical layer payload 503, which includes an IntraGroupMACIndex field 503a, a Security Layer Packet field 503b (which is set to a received security layer packet according to a security protocol supported by the AN 105), an optional padding field 503c, and a MAC Trailer field 503d. The AT 101 parses the physical layer payload 503 after successful decoding. The IntraGroupMACIndex 405 within the field 503a identifies the intended AT 101 of this packet within the group of ATs 101, which share the same set of MACIndex 401. As shown, a field 505 is provided for the CRC (Cyclic Redundancy Check)+Tail.

By way of example, each GroupMACIndex 403 corresponds to a set of 15 MAC indices 401. A one-to-one mapping is defined, for example, between the 15 MACIndex 401 and the 15 DRCs 407. An example of the MACIndex—DRC mapping is shown in Table 1.

TABLE 1

| MACIndex | DRC | Canonical transmission format | Preamble Sequence | Length |
|---|---|---|---|---|
| 72 | 0x0 | (1024, 16, 1024) | $W_{36}^{64}$ | 1024 |
| 73 | 0x1 | (1024, 16, 1024) | $\overline{W}_{36}^{64}$ | 1024 |
| 74 | 0x2 | (1024, 8, 512) | $W_{37}^{64}$ | 512 |
| 75 | 0x3 | (1024, 4, 256) | $\overline{W}_{37}^{64}$ | 256 |
| 76 | 0x4 | (1024, 2, 128) | $W_{38}^{64}$ | 128 |
| 77 | 0x5 | (2048, 4, 128) | $\overline{W}_{38}^{64}$ | 128 |
| 78 | 0x6 | (1024, 1, 64) | $W_{39}^{64}$ | 64 |
| 79 | 0x7 | (2048, 2, 64) | $\overline{W}_{39}^{64}$ | 64 |
| 80 | 0x8 | (3072, 2, 64) | $W_{40}^{64}$ | 64 |
| 81 | 0x9 | (2048, 1, 64) | $\overline{W}_{40}^{64}$ | 64 |
| 82 | 0xa | (4096, 2, 64) | $W_{41}^{64}$ | 64 |
| 83 | 0xb | (3072, 1, 64) | $\overline{W}_{41}^{64}$ | 64 |
| 84 | 0xc | (4096, 1, 64) | $W_{42}^{64}$ | 64 |
| 85 | 0xd | (5120, 2, 64) | $\overline{W}_{42}^{64}$ | 64 |
| 86 | 0xe | (5120, 1, 64) | $W_{43}^{64}$ | 64 |

As noted with this addressing mechanism, the group of ATs 101 can be assigned to the set of MAC indices (e.g., MACIndex's 401), in which each AT 101 in the group is also assigned IntraGroupMACIndex 405. The capacity of the IntraGroupMACIndex 405 is flexible. For example, up to 256 ATs 101 can be accommodated with 8-bit IntraGroupMACIndex 405. Thus, in the example above, 15 MACIndex 401 can be used to send packets to 256 ATs 101. Excluding MAC indices that are reserved, used for control channel, or for multi-user packets, there are a total of 115 MAC indices available in DO Rev. A, per 1× carrier. If seven sets of MACIndex's 401 were defined, the addressing approach, in an exemplary embodiment, would allow addressing of (256×7+10)=1802 ATs 101 per carrier. If there is a need to address more than 1802 ATs 101 per carrier, the IntraGroupMACIndex 405 size can be appropriately increased. In this way, the problem of MACIndex shortage is largely alleviated.

To support the forward link variable rate transmission, each AT 101 sends a DRC request to the AN 105. If one AT 101 is selected for transmission, the AN 105 selects the MACIndex 401 corresponding to the DRC 407 within the MACIndex set 401 the AT 101 is assigned to. The AN 105 transmits a physical layer packet with a preamble derived from the MACIndex 401. Because the intended AT 101 knows the DRC 407 that it requested, the AT 101 knows the MACIndex 401 used for transmission, as well as the bi-orthogonal sequence of the preamble. The intended AT 101 also has knowledge of the preamble length based on the DRC requested. Notwithstanding typical error events caused by noise, this packet should be correctly received by the intended AT 101, and other ATs 101 within the same group that happen to expect a new packet with the same DRC 407. It is noted that the broadcast problem wherein all ATs 101 in the network are to receive the packet is avoided. Use of the IntraGroup- MACIndex 405 in combination with the MACIndex 401 permits the AT 101 to discern that a received packet is intended for the AT 101.

Figure 6:
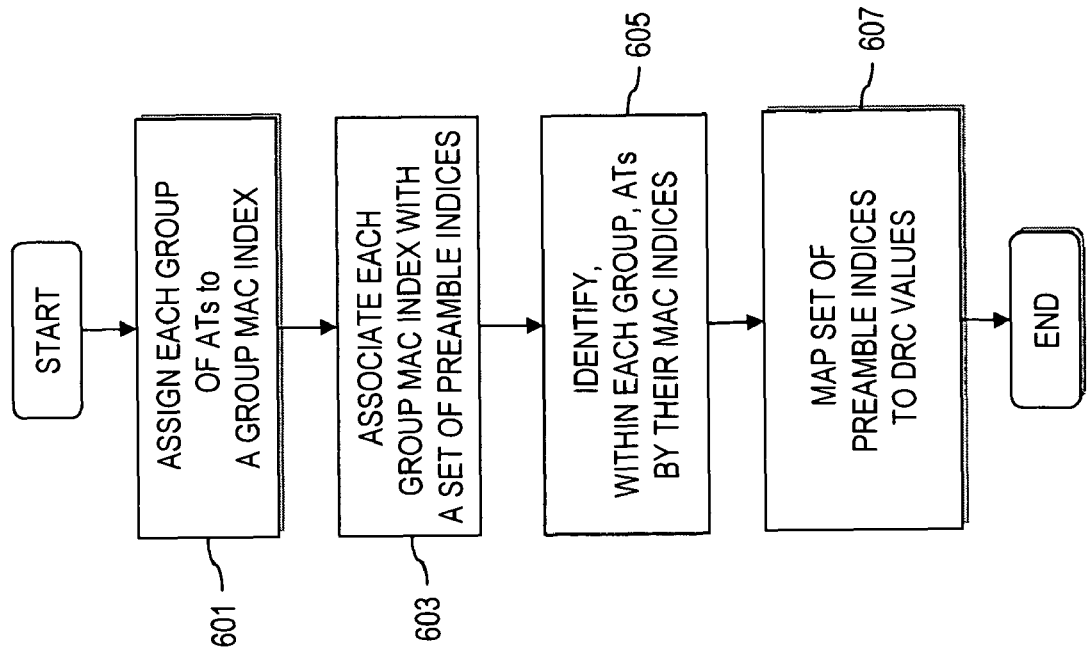
FIG. 6 is a flowchart of a process for assigning addresses to access terminals utilizing group addresses and preamble information, in accordance with an embodiment of the invention.
Figure 7:
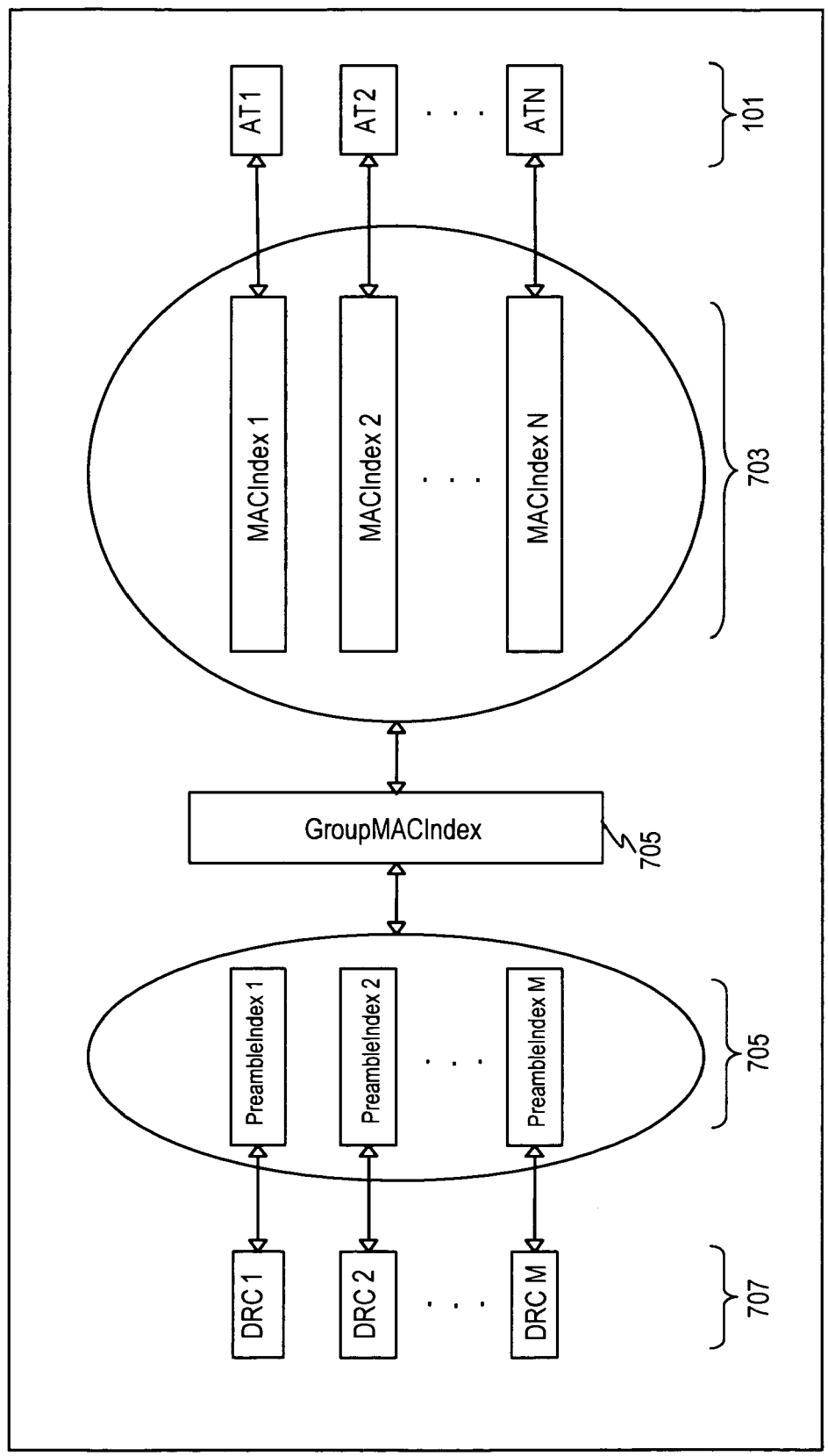
FIG. 7 is a diagram showing the relationship between group addresses and preamble information, according to various embodiments of the invention.
Figure 8:
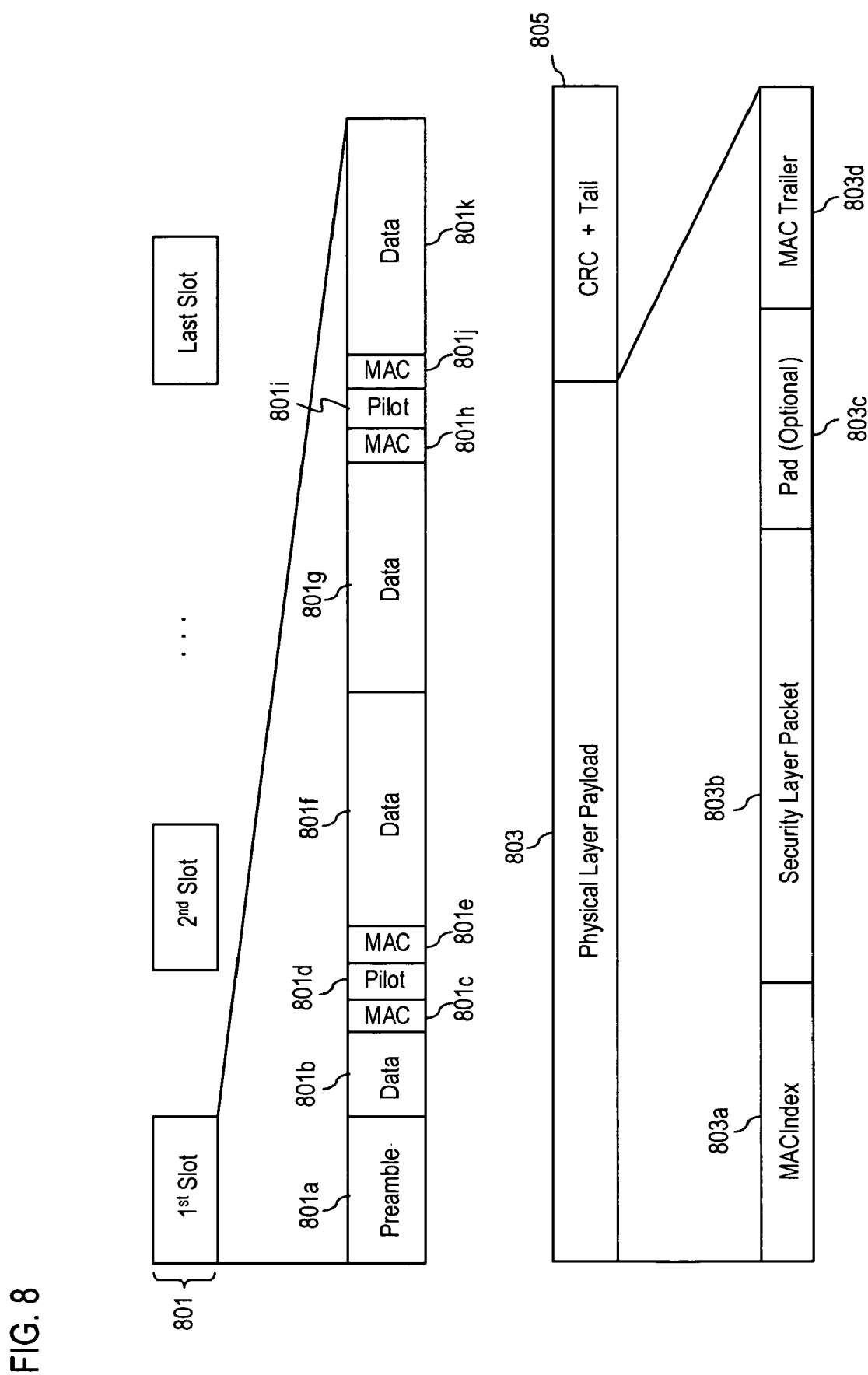
FIG. 8 is a diagram of an exemplary packet format for the addressing scheme of FIG. 6, according to various embodiments of the invention.

In an alternative embodiment, another addressing mechanism, as described in FIGS. 6-8, is provided to permit address sharing, in which backward compatibility with single carrier systems.

FIG. 6 is a flowchart of a process for assigning addresses to access terminals utilizing group address and preamble information, according to various embodiments of the invention. Under this scenario, in step 601, the system 100 can assign each group of ATs 101 to a group MAC index (i.e., "GroupMACIndex"). The GroupMACIndex is then associated, as in step 603, with a set of preamble indices that corresponding to a preamble field of a packet—these indices are denoted as "PreambleIndex." The system 100 can identify, within each group, the ATs 101 by their MAC IDs (step 605). Thus, the system 100 maps the set of preamble indices (e.g., PreambleIndex's) to DRC values of each group of ATs 101. These parameters are illustrated in FIG. 7.

FIG. 7 is a diagram showing the relationship between group addresses and preamble information, according to various embodiments of the invention. Specifically, the relationship of the ATs 101, GroupMACIndex 701, MACIndex 703, PreambleIndex 705, and DRCs 707. As explained with respect to FIG. 6, under this exemplary scheme, a GroupMACIndex 701 is assigned to each AT within a group of ATs 101. The GroupMACIndex 701 is thus associated with a set of preamble information (e.g., PreambleIndex 705), which identifies, for instance, the bi-orthogonal sequence used in a preamble field (shown in FIG. 8). Within each group, the ATs 101 are identified by their MAC indices 703. A mapping is defined between the set of PreambleIndex 705 and all possible DRC values 707.

As seen in FIG. 7, the mapping among the DRC 707 and the PreambleIndex 705, in this example, is one-to-one; however, it is contemplated that other configurations can be utilized, depending on the implementation. By way of example, each GroupMACIndex 701 corresponds to a set of 15 PreambleIndex 705. A one-to-one mapping, for example, is defined between the 15 PreambleIndex 703 and the 15 DRCs 701. This PreambleIndex—DRC mapping is shown in Table 2, below.

TABLE 2

| PreambleIndex | DRC | Canonical transmission format | Preamble Sequence | Length |
|---|---|---|---|---|
| 113 | 0x0 | (1024, 16, 1024) | $\overline{W}_{56}^{64}$ | 1024 |
| 114 | 0x1 | (1024, 16, 1024) | $W_{57}^{64}$ | 1024 |
| 115 | 0x2 | (1024, 8, 512) | $W_{57}^{64}$ | 512 |
| 116 | 0x3 | (1024, 4, 256) | $W_{58}^{64}$ | 256 |
| 117 | 0x4 | (1024, 2, 128) | $\overline{W}_{58}^{64}$ | 128 |
| 118 | 0x5 | (2048, 4, 128) | $W_{59}^{64}$ | 128 |
| 119 | 0x6 | (1024, 1, 64) | $\overline{W}_{59}^{64}$ | 64 |
| 120 | 0x7 | (2048, 2, 64) | $W_{60}^{64}$ | 64 |
| 121 | 0x8 | (3072, 2, 64) | $\overline{W}_{60}^{64}$ | 64 |
| 122 | 0x9 | (2048, 1, 64) | $W_{61}^{64}$ | 64 |
| 123 | 0xa | (4096, 2, 64) | $\overline{W}_{61}^{64}$ | 64 |
| 124 | 0xb | (3072, 1, 64) | $W_{62}^{64}$ | 64 |
| 125 | 0xc | (4096, 1, 64) | $\overline{W}_{62}^{64}$ | 64 |
| 126 | 0xd | (5120, 2, 64) | $W_{63}^{64}$ | 64 |
| 127 | 0xe | (5120, 1, 64) | $\overline{W}_{63}^{64}$ | 64 |

As in the addressing scheme of FIG. 4, the capacity of the MACIndex 703 is flexible. For example, up to 256 ATs 101 can be accommodated with 8-bit MACIndex 703. Thus, 15 PreambleIndex 705 is used to send packets to 256 ATs 101. As an example, 2-bit GroupMACIndex 701 can be utilized. To support backward compatibility, the GroupMACIndex='00' can be reserved for legacy ATs 101. This addressing scheme, according to one embodiment of the invention, allows addressing of (256×3+128−15×3)=851 ATs per carrier. Accordingly, the GroupMACIndex 701 and the MACIndex 703 can be communicated by extending the fields of a Traffic Channel Assignment message, for example. The (GroupMACIndex 705, MACIndex 707) pair, which can be a 10-bit field, uniquely identifies an AT 101.

The MAC layer single user simplex packet format can be designed as shown in FIG. 8. The format resembles that of FIG. 5; however, under this scenario, the MACIndex 707 identifies the intended AT 101 of this packet within the group of ATs 101 (which share the same GroupMACIndex). Fields 801*a*-801*k* of the first slot 801 resembles that of the slot 501 of FIG. 5. Similarly, a physical layer payload 803 followed by a CRC+Tail field 805. The physical layer payload 803 includes a MACIndex field 803*a*, a Security Layer Packet field 803*b*, an optional padding field 803*c*, and a MAC Trailer field 803*d*.

It is contemplated that the addressing mechanisms explained with respect to FIGS. 2-8 can be implemented in many forms. For example, The GroupMACIndex and IntraGroupMACIndex can combine together as the MAC ID of the AT 101. Also, each AT 101 can be assigned a MACIndex, while the GroupMACIndex and the IntraGroupMACIndex can be derived from that MACIndex. Additionally, as discussed, the mapping between DRC and MACIndex need not be one-to-one, but can one-to-many, many-to-one, or any combination thereof. Moreover, the mapping for different group of ATs 101, or different set of MACIndex, or different GroupMACIndex, can be different.

There can be multiple sets of MACIndex, i.e., multiple GroupMACIndex defined in the system 100. The definition of the set of MACIndex, the mapping between the set of MACIndex and the DRCs, the group of ATs 101, can be dynamically changed via signaling messages during the connection setup or during the communication.

The format of the IntraGroupMACIndex and the position of the IntraGroupMACIndex within the physical layer packet, the MAC layer packet, can be changed.

Furthermore, another form of index can be used to identify the intended AT 101. For example, the GroupMACIndex and the IntraGroupMACIndex need not be explicitly defined. They can be simply part of, or a function of a larger MACIndex that can identify the intended AT 101.

Further still, a single user simplex, single user multiplex, and multi-user MAC layer packet format can be created to transmit payload from one AT 101 or multiple ATs 101 in one MAC layer packet. The ATs 101 can be a 1×DO ATs 101, or a N×DO ATs 101, or mixture of both. For example, for multi-user packet, the format similar to the one defined in the current HRPD/DO standard can be used. The difference is that the N×DO ATs 101 are identified by their GroupMACIndex and IntraGroupMACIndex, instead of a single MACIndex.

The addressing scheme, according to the various embodiments, can be utilized with other MAC addressing schemes. For example, we can use time sharing/time multiplexing to allow multiple ATs 101 to share one or a set of MAC indices.

In addition to the described addressing schemes, the system 100 can employ multi-user packets (MUP) that overcomes the drawbacks of traditional MUP systems. With respect to need to avoid unnecessary battery drain, conventionally, an AT 101 enabling multi-user packets requires much larger power consumption than that of an AT 101 disabling multi-user packets. Because the AT disabling multi-user packets detects the preamble and decodes traffic data only if the preamble does contain MAC of the AT, it is not always "active" when a multi-user packet is transmitted. Assuming the decoding scheme used by the AT is based on Turbo codes, a turbo decoder of the AT consumes large amount of power. If this decoding process can be idled, then significant reducing in battery consumption can be achieved. An AT that is enabled for multi-user packets always decodes traffic data if it detects a preamble that contains a multi-user MAC. It should be noted that only after turbo decoding, does the AT know whether the multi-user packet contains its information or not. Therefore, the turbo decoder of an AT 101 (enabling multi-user packets) always stays active whenever multi-user preamble is transmitted.

It is recognized that multi-user packets are well-suited to many data network applications, such as VoIP (Voice over Internet Protocol), and consequently, should not simply be avoided. For example, in the CDMA2000 1× EV-DO (revision A) specification, a multi-user packet is introduced to support small-packet services such as the VoIP communication session, gaming, wireless application protocol, and others. The multi-user packet introduced in the media access control of CDMA2000 1× EV-DO can transmit multiple users' packets over a physical layer packet. The media access control layer header in a multi-user packet provides information needed to parse the contents of the media access control layer payload belonging to each user.

To mitigate the drawbacks of addressing schemes involving multi-user packets, the system 100 provides classification of services. These approaches are now explained.

Figure 9:
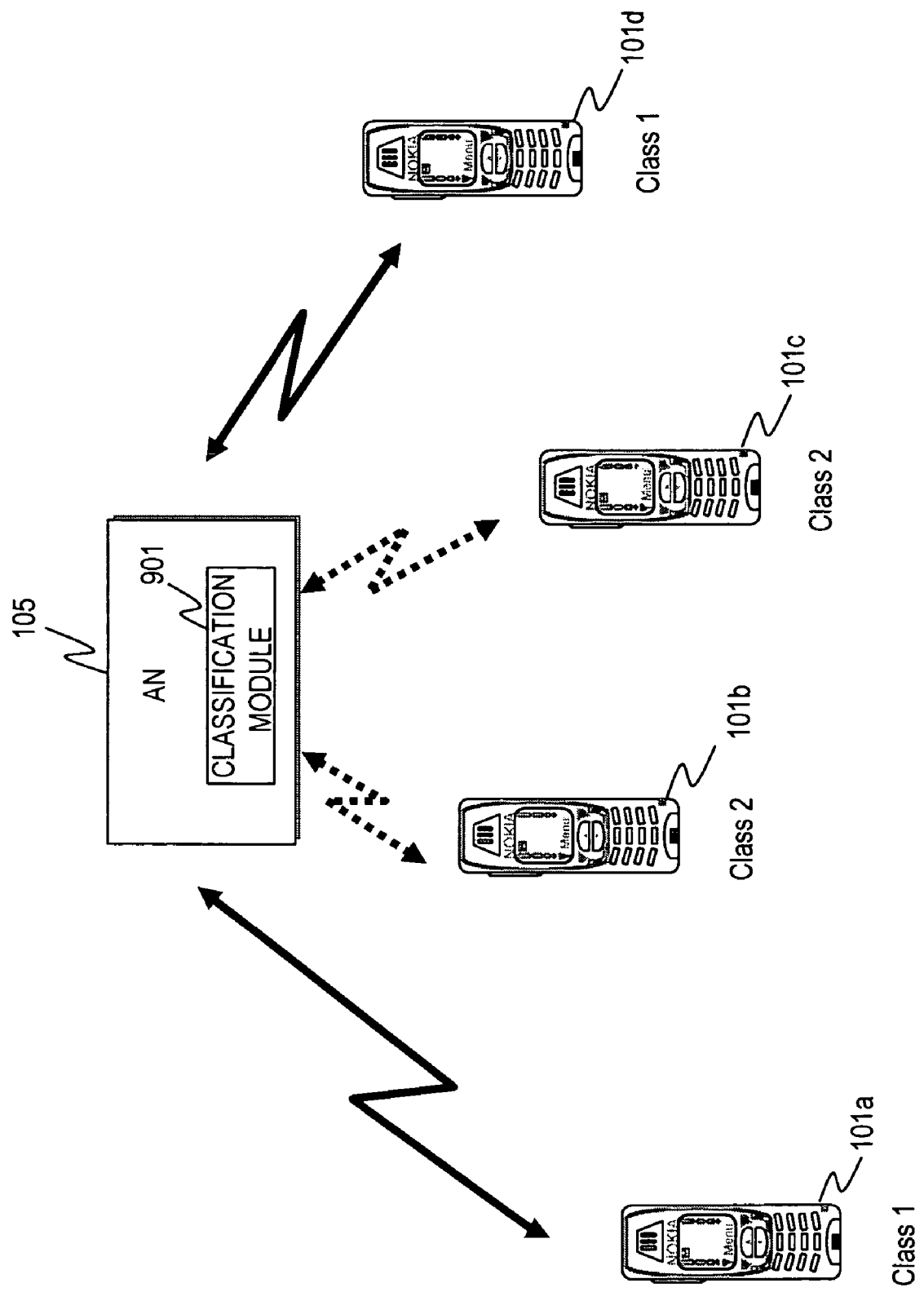
FIG. 9 is a diagram of an access network configured to utilize multi-user packets, in accordance with an embodiment of the invention.

FIG. 9 is a diagram of an access network configured to utilize multi-user packets, in accordance with an embodiment of the invention. Under this scenario, the AN 105 employs a classification module 901 to classify the ATs 101, which are configured to process multi-user packets. For instance, AT 101*a* and AT 101*d* are classified under Class 1, while AT 101*b* and AT 101*c* are grouped in Class 2. In this manner, if the multi-user packets are designated as Class 1 packets, then only AT 101*a* and AT 101 d decode the packets. Consequently, AT 101*b* and AT 101*c* of Class 2 remain inactive or idle, thereby saving power. However, if the multi-user packet is designated for Class 2 terminals, the AT 101*b* and AT 101*c* would be active, and the Class 1 terminals, AT 101*a* and AT 101*d* are idle. The classification process is more fully described below.

Figure 10:
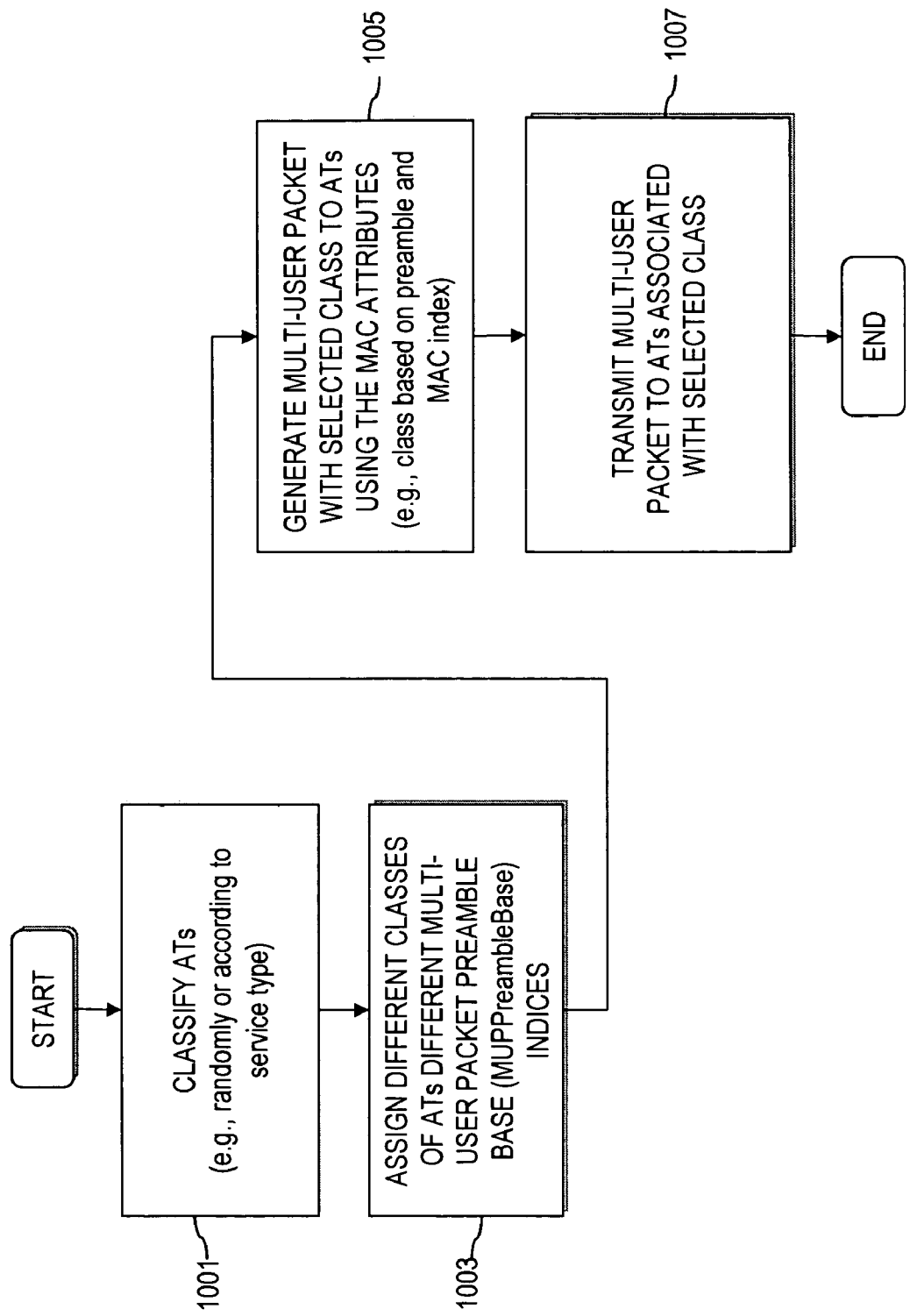
FIG. 10 is a flowchart of a process for classifying access terminals to permit use of multi-user packets, according to various embodiments of the invention.

FIG. 10 is a flowchart of a process for classifying access terminals to permit use of multi-user packets, according to various embodiments of the invention. In step 1001, the ATs 101 are classified into N classes (where N>1), according to their preamble MAC indices, per Table 3:

TABLE 3

| MAC Layer Packet Size (bits) | Preamble MAC Index |
|---|---|
| 98, 226, 482, or 994 | 66 |
| 2018 | 67 |
| 3042 | 68 |
| 4066 | 69 |
| 5090 | 70 |

As shown in the Table 4, according to one embodiment of the invention, the $i^{th}$ user is classified to the $n^{th}$ class if its MAC satisfies $MAC_i \% N = n$. The ATs 101 may be classified randomly or according to their service types.

TABLE 4

| Multi-user-packet AT class | MAC Layer Packet Size (bits) | Preamble MAC Index |
|---|---|---|
| Class 1 | 98, 226, 482, or 994 | MUPPreambleBase1 |
| Class 1 | 2018 | MUPPreambleBase1 + 1 |
| Class 1 | 3042 | MUPPreambleBase1 + 2 |
| Class 1 | 4066 | MUPPreambleBase1 + 3 |
| Class 1 | 5090 | MUPPreambleBase1 + 4 |
| Class 2 | 98, 226, 482, or 994 | MUPPreambleBase2 |
| Class 2 | 2018 | MUPPreambleBase2 + 1 |
| Class 2 | 3042 | MUPPreambleBase2 + 2 |
| Class 2 | 4066 | MUPPreambleBase2 + 3 |
| Class 2 | 5090 | MUPPreambleBase2 + 4 |
| Class 3 | 98, 226, 482, or 994 | MUPPreambleBase3 |
| Class 3 | 2018 | MUPPreambleBase3 + 1 |
| Class 3 | 3042 | MUPPreambleBase3 + 2 |
| Class 3 | 4066 | MUPPreambleBase3 + 3 |
| Class 3 | 5090 | MUPPreambleBase3 + 4 |
| ... | ... | ... |

With this scheme, AN 101 can notify each AT 101 with its class through a new MAC attribute. Thus, each different class of ATs 101 have different class of multi-user MAC indices based on its assigned multi-user packet preamble base ("MUPPreambleBase") index, as assigned in step 1003. Next, a multi-user packet with a selected class is generated, as in step 1005. As a result, when the AN 105 transmits, per step 1007, a multi-user packet specifying a selected class of MAC indices, only this class of ATs 101 are active with their decoders (e.g., turbo decoders) and other ATs associated with other classes are idle.

Under the above scheme, the power consumption of the ATs 101 supporting multi-user packets is significantly reduced during multi-user packet transmission. This is achieved due to the fact that the power consumption of decoding preamble is much lower than that of turbo decoding and can be effectively ignored.

It should also be noted that this multi-user packet transmission approach has no or little impact to single-user packet transmission: e.g., when N=2, it has no impact because the system uses different MAC indices that are used in the 3GPP2 C.S0024-A, entitled "cdma2000 High Rate Packet Data Air Interface Specification," and when N>2, the impact is small because one additional multi-user-packet class only occupy five more MAC indices; and there are 111 MAC indices available for single-user packets.

If a single-user packet is to be sent, the access terminal with highest priority can be selected, and data is transmitted to the selected access terminal using a single-user packet. Priorities can be based on a number of factors, such as account, quality of service and equipment capabilities. The priority can be provided by assigning a numerical value (e.g., 0 to 255), wherein the lower numbers indicate higher priorities. The priority may be used by a connection layer (e.g., a packet consolidation protocol) in prioritizing messages for transmission.

Figure 11:
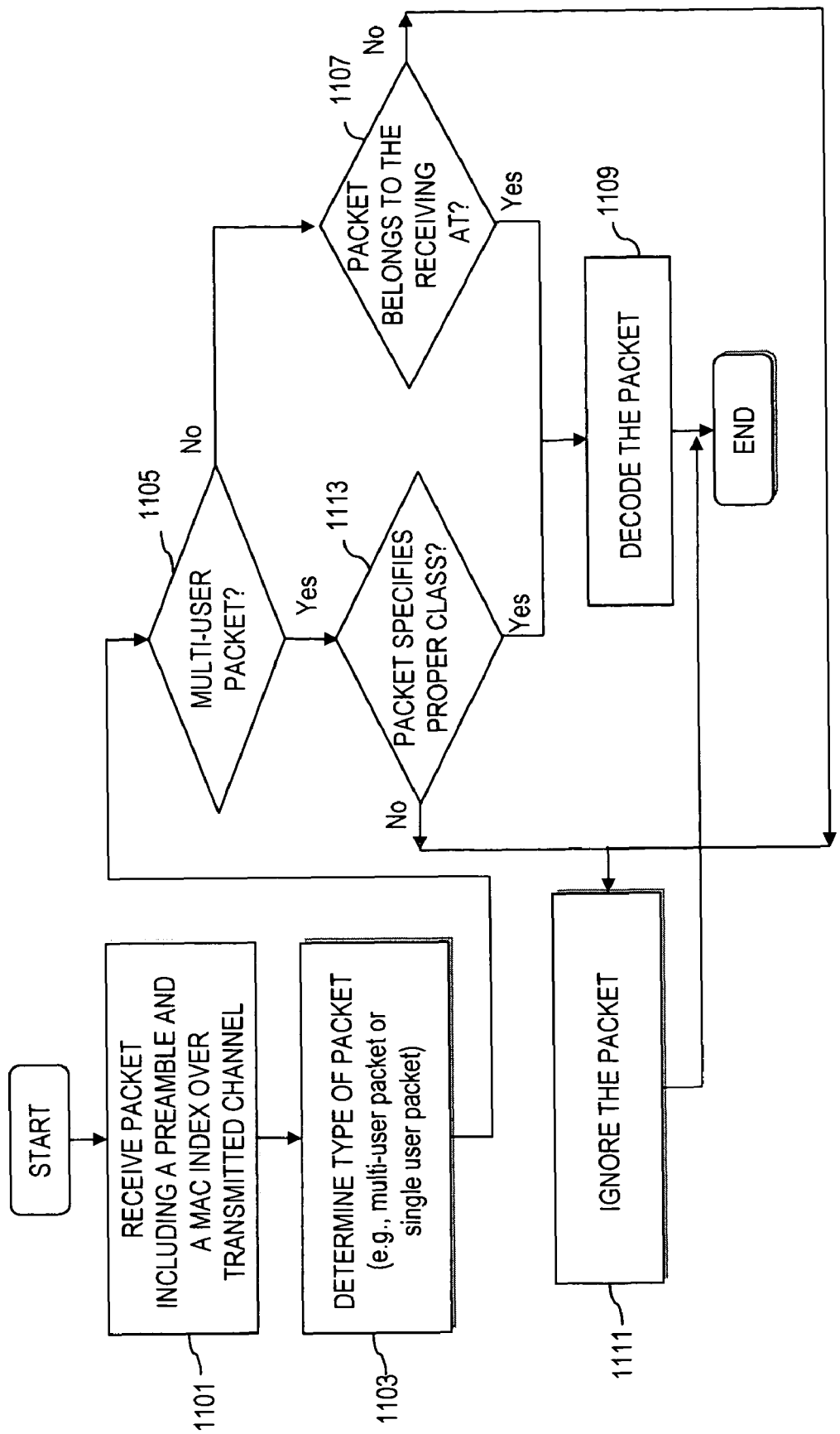
FIG. 11 is a flowchart of a process for handling multi-user packets by the access terminals, according to various embodiments of the invention.

FIG. 11 is a flowchart of a process for handling multi-user packets by the access terminals, according to various embodiments of the invention. In step 1101, an AT 101 receives a packet that specifies certain attributes (e.g., preamble and MAC index based on the service type and classification of ATs). In step 1103, the AT 101 determines whether the packet is a single-user packet or multi-user packet, per step 1105.

If the packet is a single-user packet MAC index, it is determined whether the MAC index belongs to the receiving AT (per step 1107). If the MAC index belongs to the AT 101, the AT 101 decodes the packet, as in step 1109. If the MAC index does not belong to the AT 101, the AT 101 ignores the packet (step 1111).

However, if the received packet is a multi-user packet (MUP), the AT 101 checks the preamble and the MAC index to determine whether the packet specifies the proper class, per step 1113. If the packet specifies the class of the AT (i.e., belongs to the AT class), the AT 101 decodes the packet (step 1109). Otherwise, the packet is ignored, per step 1111. Also, when a packet is decoded, it is determined whether the multi-user packet contains the AT's data. If the multi-user packet contains the AT's data, then the AT sends its own data to an upper layer protocol or application. If the multi-user packet does not contain the terminal's data, the packet can be ignored.

One of ordinary skill in the art would recognize that the processes for providing addressing within a multi-carrier system may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 12:
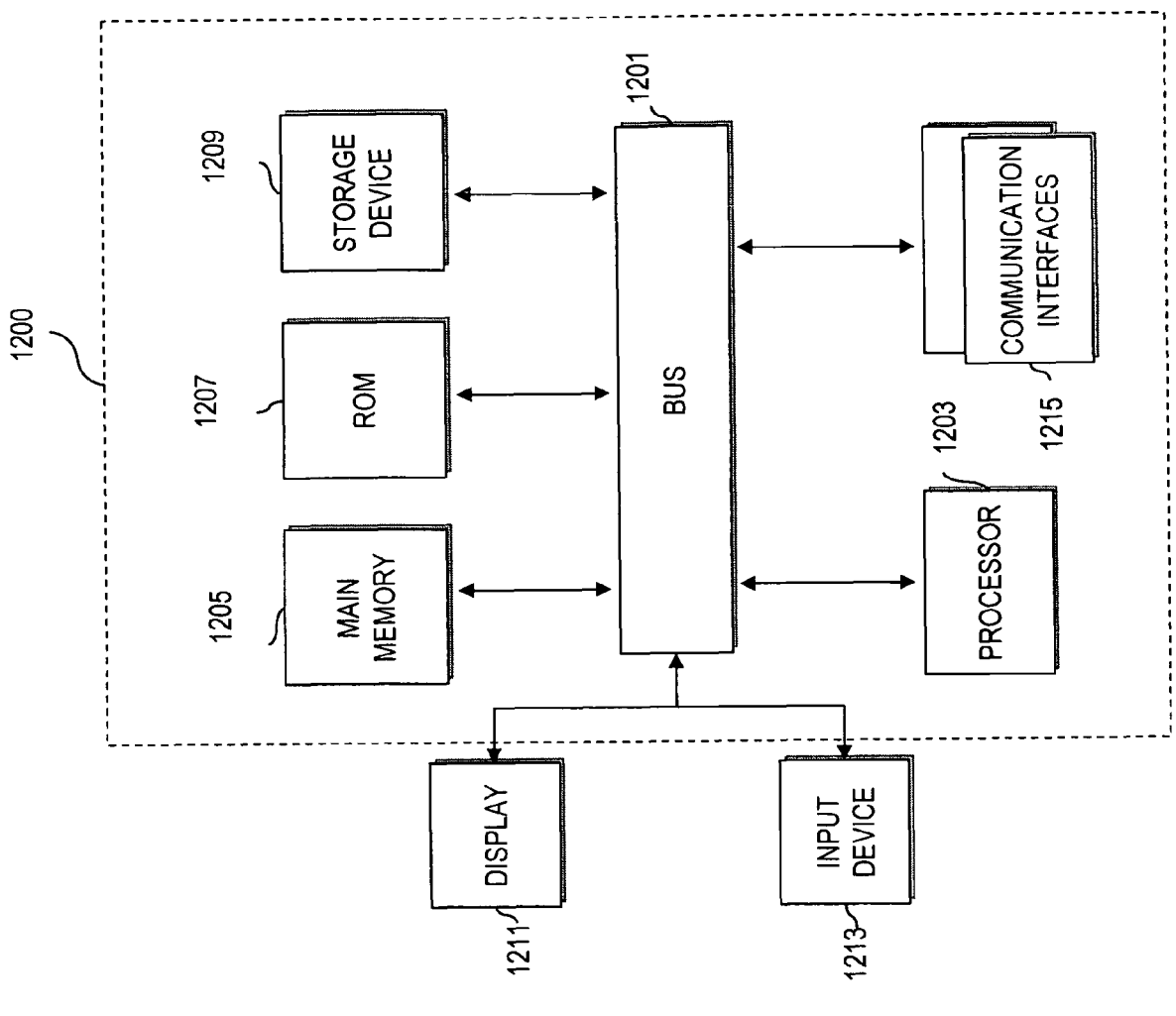
FIG. 12 is a diagram of hardware that can be used to implement an embodiment of the invention.

FIG. 12 illustrates exemplary hardware upon which various embodiments of the invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled via the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 13A:
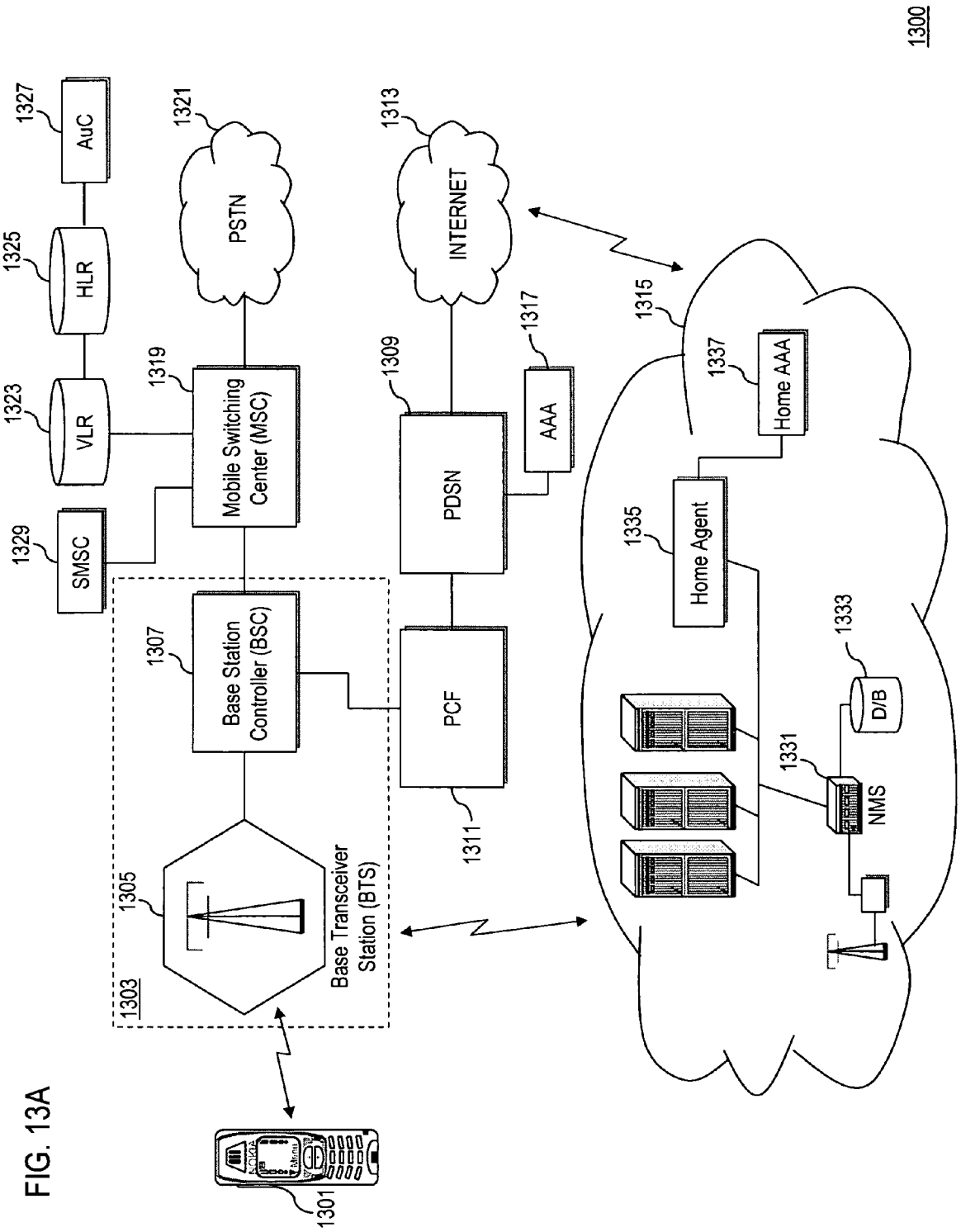
FIGS. 13A and 13B are diagrams of different cellular mobile phone systems capable of supporting various embodiments of the invention.
Figure 13B:
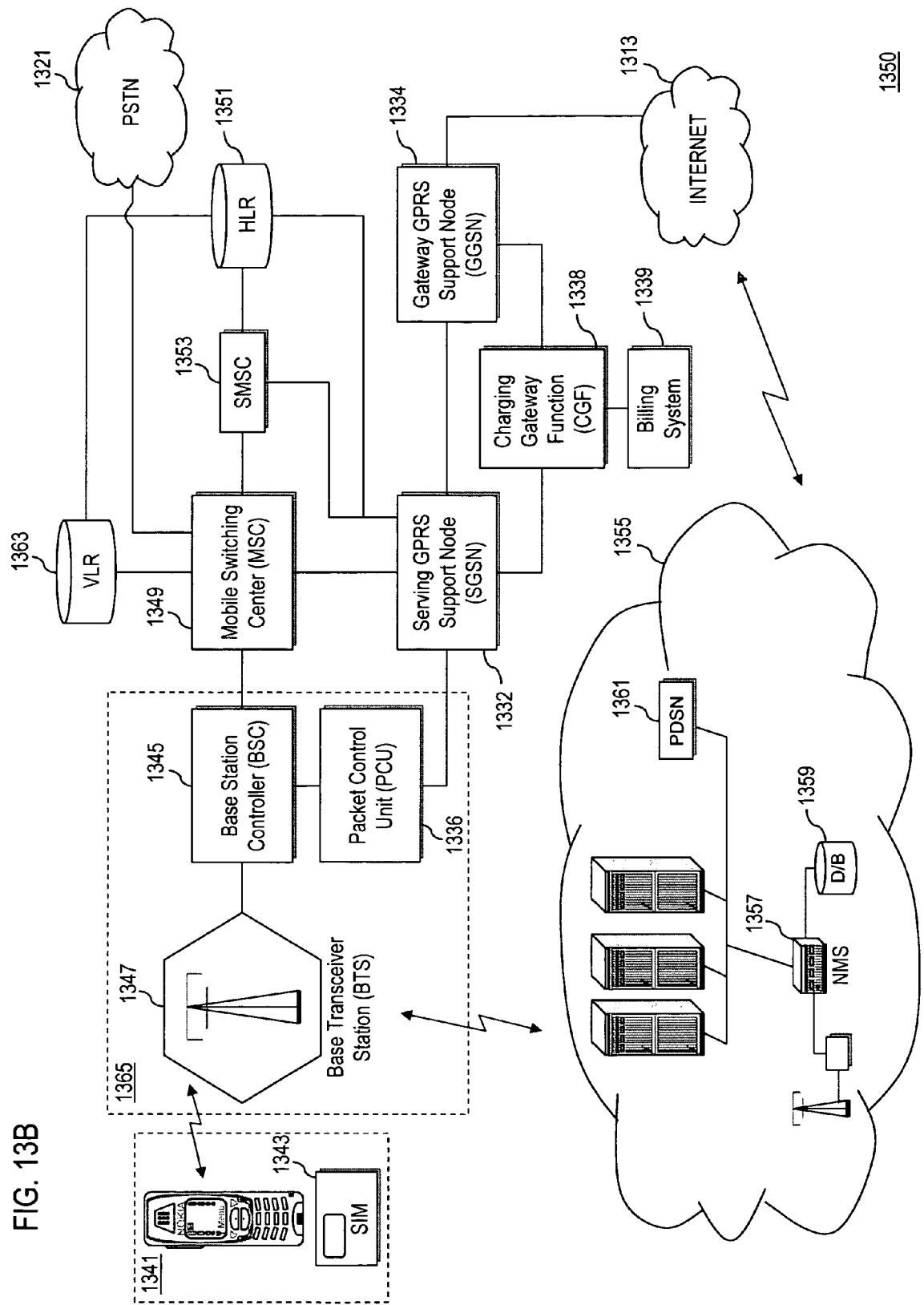

FIGS. 13A and 13B are diagrams of different cellular mobile phone systems capable of supporting various embodiments of the invention. FIGS. 13A and 13B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 1300 includes mobile stations 1301 (e.g., handsets, terminals, stations, units, devices, or any type of interface to the user (such as "wearable" circuitry, etc.)) in communication with a Base Station Subsystem (BSS) 1303. According to one embodiment of the invention, the radio network supports Third Generation (3G) services as defined by the International Telecommunications Union (ITU) for International Mobile Telecommunications 2000 (IMT-2000).

In this example, the BSS 1303 includes a Base Transceiver Station (BTS) 1305 and Base Station Controller (BSC) 1307. Although a single BTS is shown, it is recognized that multiple BTSs are typically connected to the BSC through, for example, point-to-point links. Each BSS 1303 is linked to a Packet Data Serving Node (PDSN) 1309 through a transmission control entity, or a Packet Control Function (PCF) 1311. Since the PDSN 1309 serves as a gateway to external networks, e.g., the Internet 1313 or other private consumer networks 1315, the PDSN 1309 can include an Access, Authorization and Accounting system (AAA) 1317 to securely determine the identity and privileges of a user and to track each user's activities. The network 1315 comprises a Network Management System (NMS) 1331 linked to one or more databases 1333 that are accessed through a Home Agent (HA) 1335 secured by a Home AAA 1337.

Although a single BSS 1303 is shown, it is recognized that multiple BSSs 1303 are typically connected to a Mobile Switching Center (MSC) 1319. The MSC 1319 provides connectivity to a circuit-switched telephone network, such as the Public Switched Telephone Network (PSTN) 1321. Similarly, it is also recognized that the MSC 1319 may be connected to other MSCs 1319 on the same network 1300 and/or to other radio networks. The MSC 1319 is generally collocated with a Visitor Location Register (VLR) 1323 database that holds temporary information about active subscribers to that MSC 1319. The data within the VLR 1323 database is to a large extent a copy of the Home Location Register (HLR) 1325 database, which stores detailed subscriber service subscription information. In some implementations, the HLR 1325 and VLR 1323 are the same physical database; however, the HLR 1325 can be located at a remote location accessed through, for example, a Signaling System Number 7 (SS7) network. An Authentication Center (AuC) 1327 containing subscriber-specific authentication data, such as a secret authentication key, is associated with the HLR 1325 for authenticating users. Furthermore, the MSC 1319 is connected to a Short Message Service Center (SMSC) 1329 that stores and forwards short messages to and from the radio network 1300.

During typical operation of the cellular telephone system, BTSs 1305 receive and demodulate sets of reverse-link signals from sets of mobile units 1301 conducting telephone calls or other communications. Each reverse-link signal received by a given BTS 1305 is processed within that station. The resulting data is forwarded to the BSC 1307. The BSC 1307 provides call resource allocation and mobility management functionality including the orchestration of soft handoffs between BTSs 1305. The BSC 1307 also routes the received data to the MSC 1319, which in turn provides additional routing and/or switching for interface with the PSTN 1321. The MSC 1319 is also responsible for call setup, call termination, management of inter-MSC handover and supplementary services, and collecting, charging and accounting information. Similarly, the radio network 1300 sends forward-link messages. The PSTN 1321 interfaces with the MSC 1319. The MSC 1319 additionally interfaces with the BSC 1307, which in turn communicates with the BTSs 1305, which modulate and transmit sets of forward-link signals to the sets of mobile units 1301.

As shown in FIG. 13B, the two key elements of the General Packet Radio Service (GPRS) infrastructure 1350 are the Serving GPRS Supporting Node (SGSN) 1332 and the Gateway GPRS Support Node (GGSN) 1334. In addition, the GPRS infrastructure includes a Packet Control Unit PCU (1236) and a Charging Gateway Function (CGF) 1338 linked to a Billing System 1339. A GPRS the Mobile Station (MS) 1341 employs a Subscriber Identity Module (SIM) 1343.

The PCU 1336 is a logical network element responsible for GPRS-related functions such as air interface access control, packet scheduling on the air interface, and packet assembly and re-assembly. Generally the PCU 1336 is physically integrated with the BSC 1345; however, it can be collocated with a BTS 1347 or a SGSN 1332. The SGSN 1332 provides equivalent functions as the MSC 1349 including mobility management, security, and access control functions but in the packet-switched domain. Furthermore, the SGSN 1332 has connectivity with the PCU 1336 through, for example, a Fame Relay-based interface using the BSS GPRS protocol (BSSGP). Although only one SGSN is shown, it is recognized that that multiple SGSNs 1331 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 1345, any given BSC 1345 generally interfaces with one SGSN 1332. Also, the SGSN 1332 is optionally connected with the HLR 1351 through an SS7-based interface using GPRS enhanced Mobile Application Part (MAP) or with the MSC 1349 through an SS7-based interface using Signaling Connection Control Part (SCCP). The SGSN/HLR interface allows the SGSN 1332 to provide location updates to the HLR 1351 and to retrieve GPRS-related subscription information within the SGSN service area. The SGSN/MSC interface enables coordination between circuit-switched services and packet data services such as paging a subscriber for a voice call. Finally, the SGSN 1332 interfaces with a SMSC 1353 to enable short messaging functionality over the network 1350.

The GGSN 1334 is the gateway to external packet data networks, such as the Internet 1313 or other private customer networks 1355. The network 1355 comprises a Network Management System (NMS) 1357 linked to one or more databases 1359 accessed through a PDSN 1361. The GGSN 1334 assigns Internet Protocol (IP) addresses and can also authenticate users acting as a Remote Authentication Dial-In User Service host. Firewalls located at the GGSN 1334 also perform a firewall function to restrict unauthorized traffic. Although only one GGSN 1334 is shown, it is recognized that a given SGSN 1332 may interface with one or more GGSNs 1333 to allow user data to be tunneled between the two entities as well as to and from the network 1350. When external data networks initialize sessions over the GPRS network 1350, the GGSN 1334 queries the HLR 1351 for the SGSN 1332 currently serving a MS 1341.

The BTS 1347 and BSC 1345 manage the radio interface, including controlling which Mobile Station (MS) 1341 has access to the radio channel at what time. These elements essentially relay messages between the MS 1341 and SGSN 1332. The SGSN 1332 manages communications with an MS 1341, sending and receiving data and keeping track of its location. The SGSN 1332 also registers the MS 1341, authenticates the MS 1341, and encrypts data sent to the MS 1341.

Figure 14:
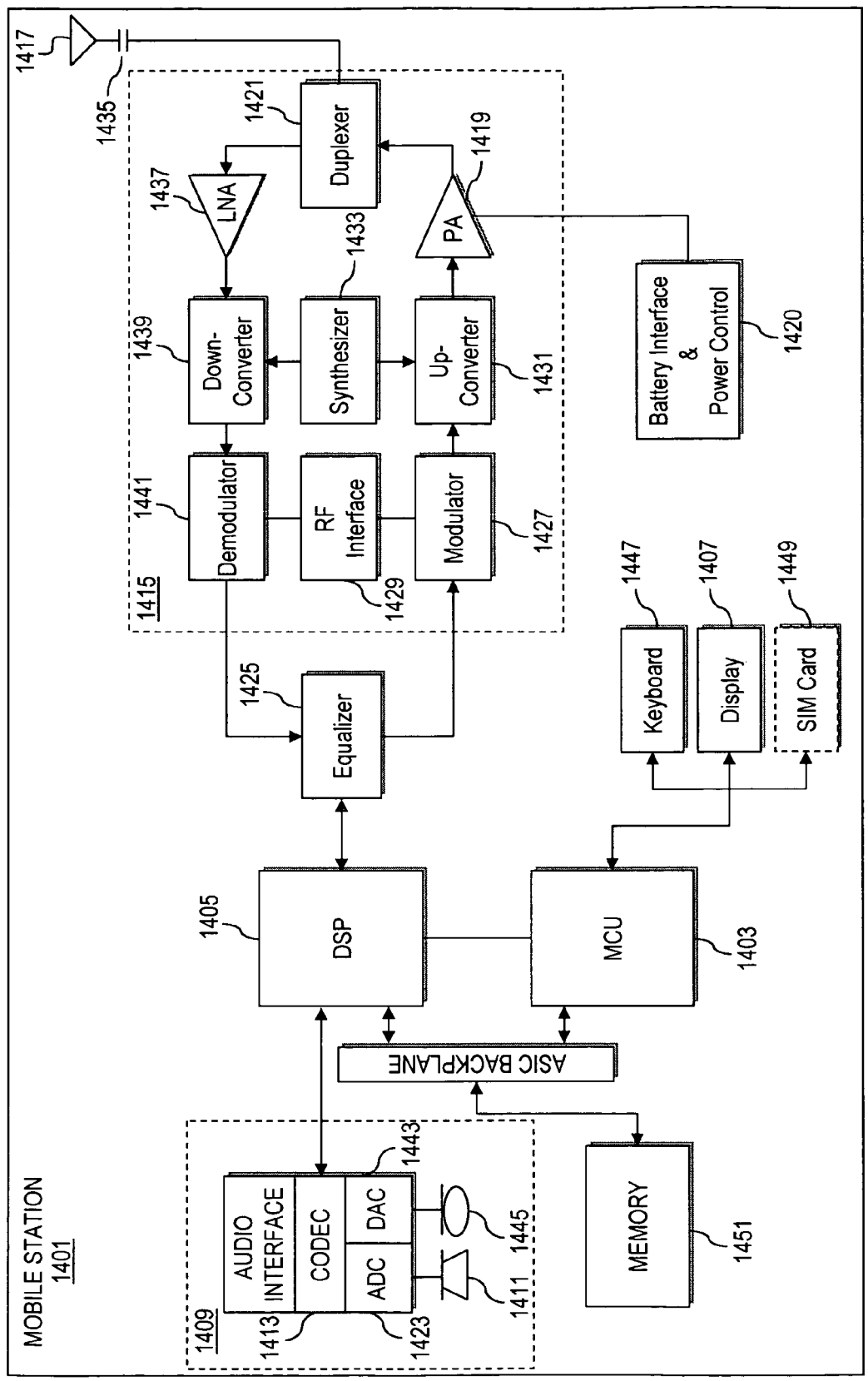
FIG. 14 is a diagram of exemplary components of a mobile station capable of operating in the systems of FIGS. 13A and 13B, according to an embodiment of the invention.

FIG. 14 is a diagram of exemplary components of a mobile station (e.g., handset) capable of operating in the systems of FIGS. 13A and 13B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system (e.g., systems of FIG. 13A or 13B), via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The MCU 1403 delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

Figure 15:
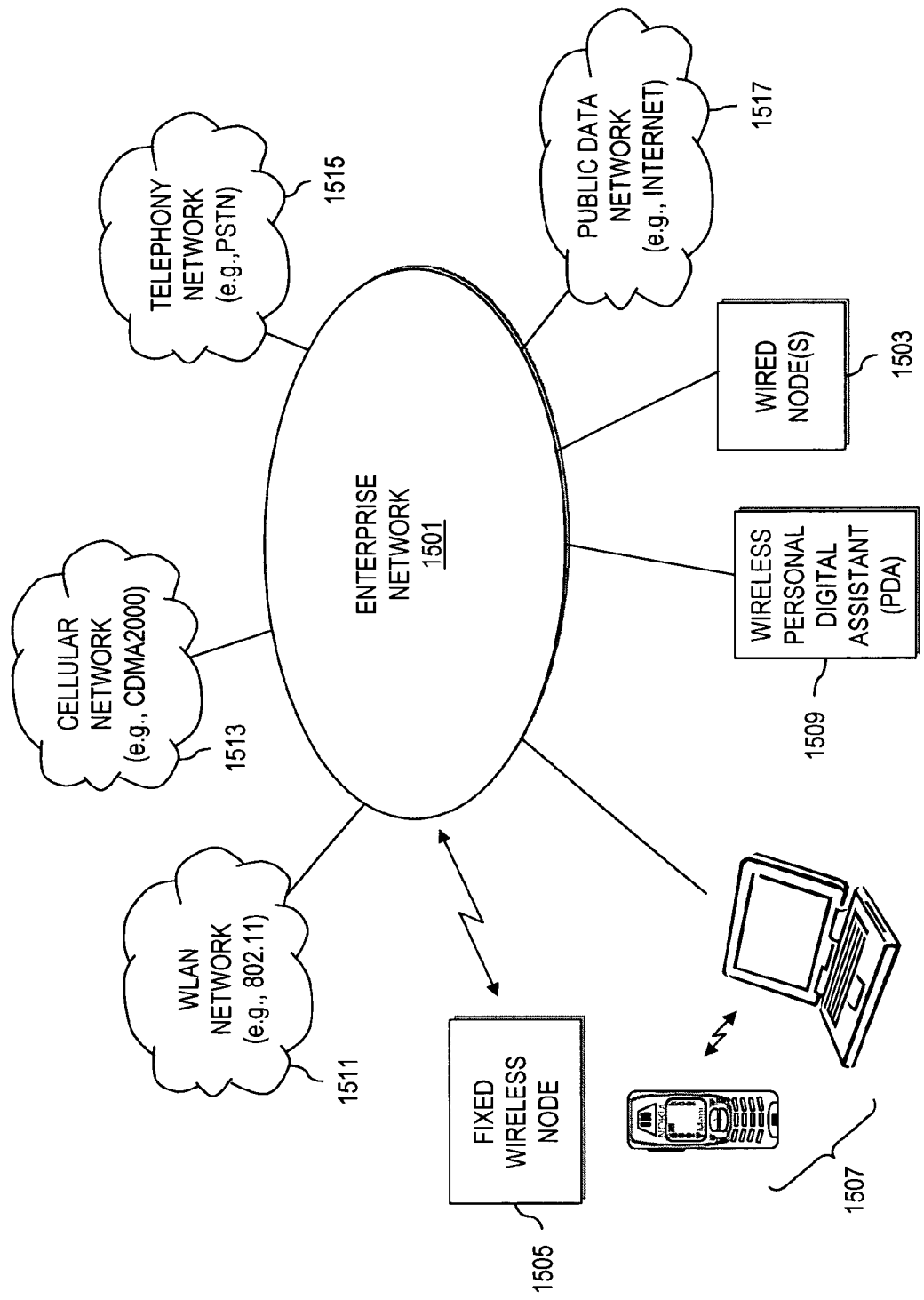
FIG. 15 is a diagram of an enterprise network capable of supporting the processes described herein, according to an embodiment of the invention.

FIG. 15 shows an exemplary enterprise network, which can be any type of data communication network utilizing packet-based and/or cell-based technologies (e.g., Asynchronous Transfer Mode (ATM), Ethernet, IP-based, etc.). The enterprise network 1501 provides connectivity for wired nodes 1503 as well as wireless nodes 1505-1509 (fixed or mobile), which are each configured to perform the processes described above. The enterprise network 1501 can communicate with a variety of other networks, such as a WLAN network 1511 (e.g., IEEE 802.11), a cdma2000 cellular network 1513, a telephony network 1516 (e.g., PSTN), or a public data network 1517 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    assigning a group index to a group of terminals of a communication network,
    wherein the group index permits sharing of addressing indices supported by the communication network for transmission of data to the group of terminals; and
    assigning an intragroup index to each of the terminals in the group to uniquely identify the terminals within the group.

2. A method according to claim 1, wherein a combination of one of the group indices and one of the intragroup indices serves as a corresponding one of the addressing indices.

3. A method according to claim 1, wherein the group indices and the intragroup indices are derived from the addressing indices.

4. A method according to claim 1, further comprising:
    mapping a plurality of transmission channels to the addressing indices or preamble indices, wherein each of the group indices is associated with a set of the preamble indices that identify values of a preamble field within a packet, the packet including the data.

5. A method according to claim 4, wherein the transmission channels include Data Rate Control (DRC) channels, and the addressing indices include Medium Access Control (MAC) indices.

6. A method according to claim 4, wherein the mapping is performed dynamically in response to a signaling message.

7. An apparatus comprising:
    at least one processor; and
    at least one memory including computer program code for one or more programs,
    the at least one memory and the computer program code configured to, with the at least one processor, cause the apparatus to perform at least the following,
    assign a group index to a group of terminals of a communication network; and
    assign an intragroup index to each of the terminals in the group to uniquely identify the terminals within the group,
    wherein the group index permits sharing of addressing indices supported by the communication network for transmission of data to the group of terminals.

8. An apparatus according to claim 7, wherein a combination of one of the group indices and one of the intragroup indices serves as a corresponding one of the addressing indices.

9. An apparatus according to claim 7, wherein the group indices and the intragroup indices are derived from the addressing indices.

10. An apparatus according to claim 7, wherein the apparatus is further caused to map a plurality of transmission channels to the addressing indices or preamble indices, wherein each of the group indices is associated with a set of the preamble indices that identify values of a preamble field within a packet, the packet including the data.

11. An apparatus according to claim 10, wherein the transmission channels include Data Rate Control (DRC) channels, and the addressing indices include Medium Access Control (MAC) indices.

12. An apparatus according to claim 10, wherein the mapping is performed dynamically in response to a signaling message.

13. An apparatus according to claim 7, further comprising:
    a transceiver configured to receive user input to initiate communication over the communication network; and
    a display configured to display the user input.

14. A system comprising the apparatus of claim 7, the system further comprising:
    a base station controller configured to transmit the data to a mobile switching center.

* * * * *